United States Patent [19]
Churchman, deceased

[11] 3,873,149
[45] Mar. 25, 1975

[54] BODY AND TAILGATE ASSEMBLY FOR A TRUCK OR SIMILAR VEHICLE

[75] Inventor: Henry W. Churchman, deceased, late of Wichita, Kans. by Mildred Churchman, administratrix

[73] Assignee: Helix Corporation, Crown Point, Ind.

[22] Filed: Apr. 3, 1972

[21] Appl. No.: 240,432

[52] U.S. Cl.................................. 296/56, 49/281
[51] Int. Cl............................................... B60j 5/10
[58] Field of Search................... 296/50, 56, 106; 298/23 MD, 23 S; 49/255, 257, 272, 279, 280, 281

[56] References Cited
UNITED STATES PATENTS
674,490    5/1901    Watkins........................... 49/260 X
1,023,625  4/1912    Corey................................... 49/255
1,105,464  7/1914    Stickler................................ 296/56
2,239,029  4/1941    Barrett........................ 298/23 MD
2,246,358  6/1941    Jelinek et al..................... 296/56 X
3,584,755  6/1971    Smith................................ 214/83.3
3,757,969  9/1973    Smith................................ 296/56 X Primary Examiner—Robert J. Spar
Assistant Examiner—Leslie J. Paperner
Attorney, Agent, or Firm—Oltsch & Knoblock

[57] ABSTRACT

A combination body and tailgate assembly for a truck or similar vehicle in which the tailgate is released from the body and pivoted first into an open position and then into a locked closed position by a power actuated mechanism which causes vertical shiftable movement of the tailgate relative to the body in conjunction with the pivotal movement of the tailgate.

3 Claims, 6 Drawing Figures

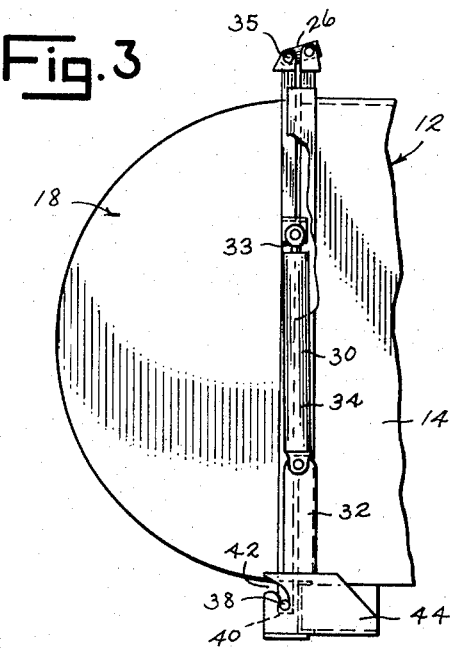
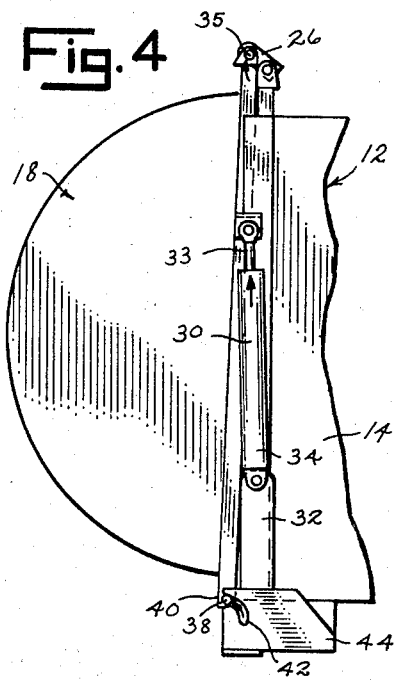
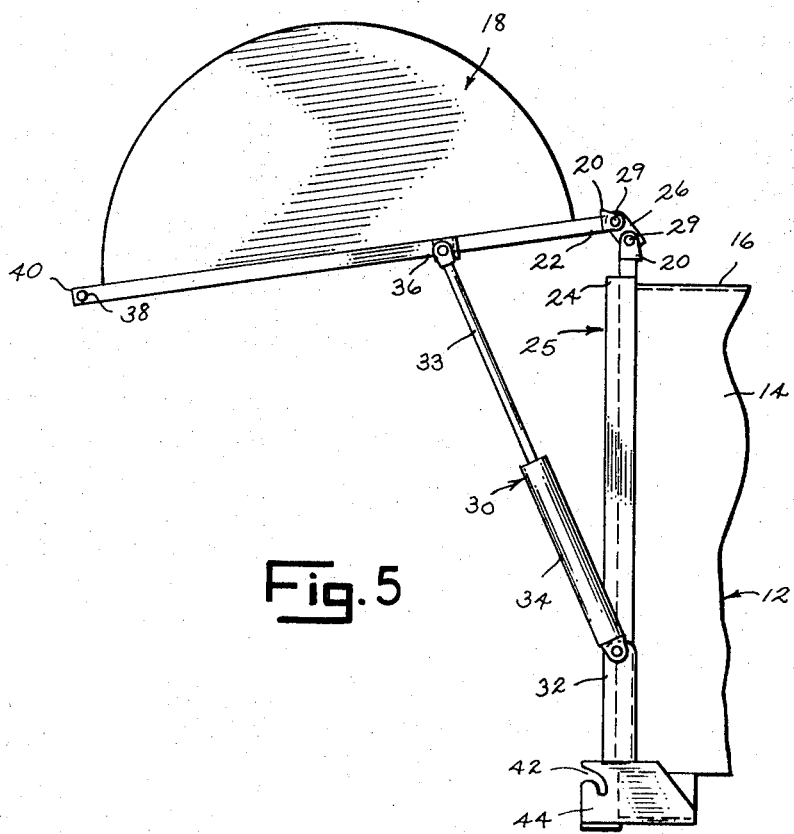

BODY AND TAILGATE ASSEMBLY FOR A TRUCK OR SIMILAR VEHICLE

SUMMARY OF THE INVENTION

This invention relates to a tailgate assembly for a truck or similar vehicle body which will have specific, but not limited, application to a refuse or waste removal truck.

The tailgate is pivotally connected at its upper edge portion to the open end of the vehicle body and is constructed in combination with the body so as to be shiftable both pivotally and vertically relative to the body, enabling the tailgate to be released from its locked, closed position, pivoted into an open position, pivoted again into its closed position and locked in a substantially continuous movement requiring a minimum of operating parts. The release of the tailgate from its locked relationship with the vehicle body is effected by the vertical shifting of the entire tailgate relative to the body without the necessity of using the multitude of operating lock parts shown and described in U.S. Pat. Nos. 3,272,552 and 3,440,763.

Accordingly, it is an object of this invention to provide a combination tailgate and body assembly for a vehicle in which the tailgate is opened and closed in a combination of vertical and pivotal movements.

Another object of this invention is to provide a tailgate and body assembly for a truck in which the tailgate is pivoted between open and locked closed positions relative to the body of the truck in a simple, fluid manner.

Still another object of this invention is to provide a tailgate for a truck which is shiftable between open and locked closed positions in a safe and reliable manner.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 3 is a side elevational view in fragmentary form showing the tailgate in its closed position with portions of the body broken away to illustrate the actuating mechanisms of the tailgate.

FIG. 4 is a side elevational view in fragmentary form showing an initial stage of operation of the actuating mechanism for opening the tailgate.

FIG. 5 is a side elevational view in fragmentary form showing the tailgate in its open position.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Figure 1:
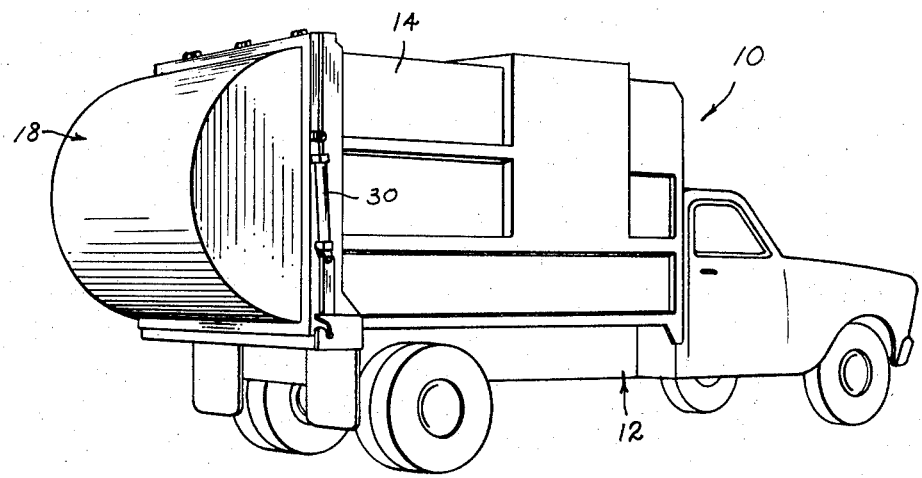
FIG. 1 is a perspective view of a truck having a body and tailgate pivotally connected to such body in accordance with the teachings of this invention.

In FIG. 1, a truck 10 is shown. Truck 10 includes a body 12 which includes the wheel supported frame and which has side walls 14 connected by a top wall 16 and a bottom wall (not shown). Body 12 of truck 10 is open at one end 25 and has a tailgate 18 pivotally connected thereto. A plurality of oppositely positioned laterally spaced projections 20 are attached to the upper edge portion 22 of tailgate 18 and the rear edge portion 24 of body top wall 16 adjacent the open end 25 of the body. A link 26 is connected by pins 29 to each pair of oppositely positioned projections 20 of the tailgate 18 and body 12 and serves in conjunction with the projections as a pivot connection for the tailgate.

Figure 2:
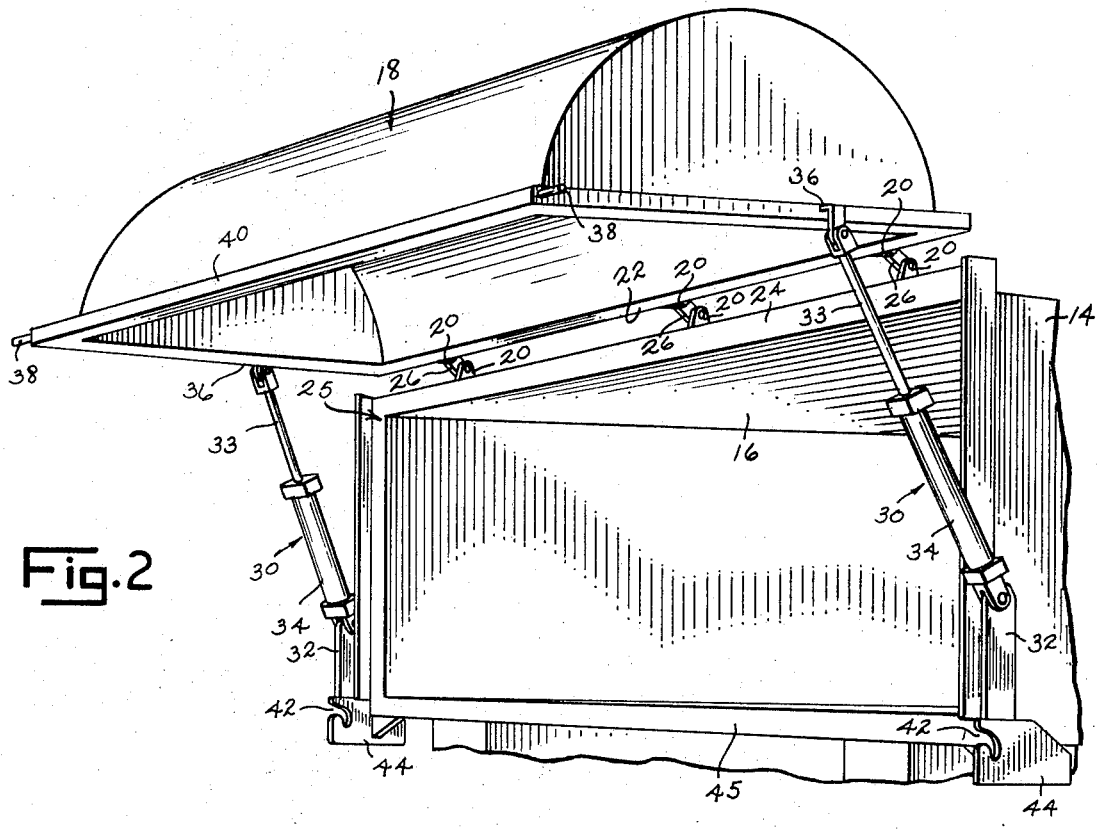
FIG. 2 is a fragmentary perspective view of the body and tailgate illustrated in FIG. 1 and shown with the tailgate in its open position.
Figure 6:
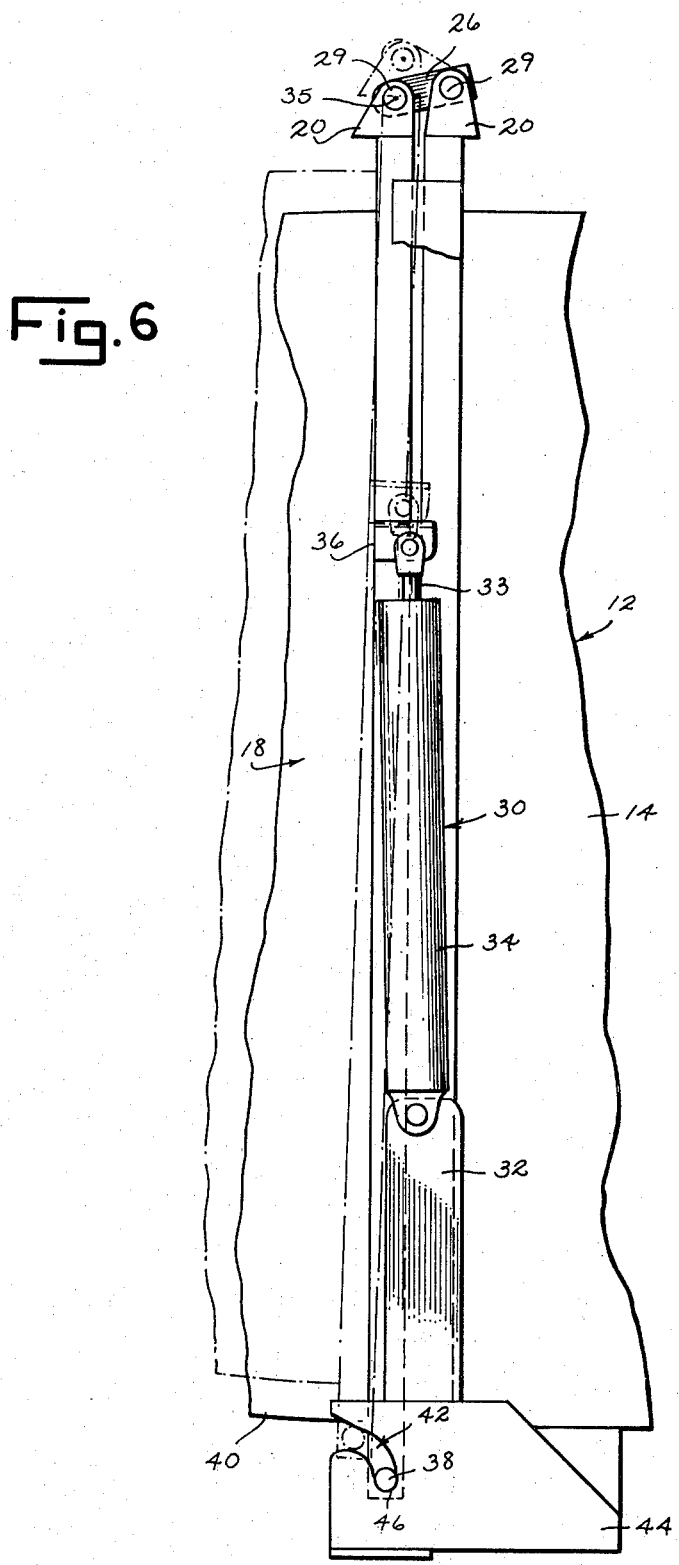
FIG. 6 is a detailed fragmentary view showing the tailgate and its actuating mechanism in solid lines in one operative form in which the tailgate is locked in its closed position and in broken lines in a second operative position in which the tailgate is unlocked in preparation for pivoting the tailgate into its open position.

A power cylinder 30, which includes an extendible and retractable piston rod 33 and cylinder part 34 and which may be hydraulically actuated, is positioned at each side of truck body 12 adjacent open end 25. Each power cylinder 30 is connected between body 12 and tailgate 18 so as to cause, upon actuation, the tailgate to be pivoted between the closed position illustrated in FIGS. 1 and 3 and the open position illustrated in FIGS. 2 and 5. One end of each power cylinder 30 is pivotally connected to a bracket 32 secured to body 12 of the truck. The opposite end of each power cylinder, which in this case is the extendible piston rod 33, is pivotally connected to a side edge 36 of tailgate 18. The actuation of power cylinders 30 which causes the extension and retraction of rods 33 thereof may be effected by a suitable pump and fluid reservoir (not shown) which are carried by truck 10. The controls for the pump and the valves thereof are preferably housed within the cab of truck 10. With tailgate 18 spanning open end 25 and being positioned in its locked closed position as illustrated in FIGS. 1 and 3, the pivot connection of each piston rod 33 to tailgate 18 is located above and slightly rearwardly of the pivot connection of its associated cylinder part 34 to the truck body 10 so that the cylinder is substantially vertically oriented along the plane of the open end when the tailgate is closed and upon actuation of the power cylinders and the extension of the piston rods the bottom edge portion 40 of the tailgate will be moved upwardly and rearwardly and the pivot axis 35 of the tailgate will be moved upwardly, as shown by the broken line illustration in FIG. 6 and by FIGS. 3 and 4. The terms "forward," "forwardly," "rearward," "rearwardly" and similar directional references used herein and the appended claims are with reference to the orientation of the vehicle.

A pin 38 projects laterally outwardly from each side of tailgate 18 adjacent its bottom edge portion 40. Each pin 38 fits within a forwardly projecting downwardly extending arcuate slot 42 which is formed in a bracket 44 secured to truck body 12 at each side thereof and adjacent the lower edge portion 45 of the open end 25 of the body. With tailgate 18 in its locked closed position spanning open end 25 of body 12, each pin 38 will be seated at the bottom 46 of its associated slot 42 to prevent opening of the tailgate. As power cylinders 30 are actuated to extend piston rods 33 to open tailgate 18, the tailgate, as previously explained, will shift upwardly as shown in the broken lines in FIG. 6, causing pins 38 to be cammed upwardly and rearwardly in slots 42 until pins 38 are released from brackets 44. Upon further extension of piston rods 33, the tailgate is pivoted upwardly and rearwardly about links 26 into the open position illustrated in FIGS. 2 and 5. To close and lock tailgate 18, a suitable control lever is actuated in the cab of truck 10 to retract piston rods 33 and permit the tailgate to pivot from the open position of FIG. 5 into the broken line position shown in FIG. 6 where pins 38 re-enter slots 42. Continued actuation of power cylinders 30 to further retract piston rods 33 causes pins 38 to be cammed forwardly and downwardly into slots 42 thereby shifting the tailgate forwardly and downwardly into its locked closed position.

Both the unlocking and opening and the closing and locking of tailgate 18 are effected in one continuous operation by the extension and retraction of piston rods 33 of power cylinders 30 without the user of the truck 10 having to leave his cab. The lock mechanism for tailgate 18 is constructed with a minimum of moving parts so as to eliminate the inconvenience, maintenance and wear problems associated with prior art locking devices for such tailgates.

It is to be understood that the invention is not to be limited to the details herein given but may be modified within the scope of the appended claims.

What I claim is:

1. In combination, a vehicle body open at one end and a tailgate having upper and lower edge portions, means pivotally connecting said tailgate at its upper edge portion to said body so that said tailgate is pivotal about an axis between a closed position spanning said one end of the body and an open position, said connecting means between said tailgate and body including a link means pivotally connected at one end to said tailgate upper edge portion and pivotally connected at its opposite end to said body above said open end therein, the pivot connection of said one end of the link means to said tailgate forming said tailgate pivot axis, link means for shifting said tailgate pivot axis between upper and lower locations relative to said body including a spaced pair of power actuated cylinder means for moving said tailgate between its open and closed positions, said cylinder means such including an extendible and retractable piston rod slidable within a cylinder part, each said rod being pivotally connected at one end to said tailgate, each said cylinder part being pivotally connected at one end to the body, the pivot connection of each said cylinder part being at opposite sides of the open end of the body such that said cylinder means is substantially vertically oriented along the plane of the open end when said tailgate is in the closed position, the pivot connection of each said rod to said tailgate being above and rearwardly of the pivot connection of the cylinder part to said body whereby actuation of said cylinder means causing initial extension of said rod will cause said tailgate pivot axis and link means to be shifted upwardly into said upper location of said pivot axis and actuation of said cylinder means causing final retraction of said rod will cause said tailgate pivot axis and link means to be shifted downwardly into said lower location of said pivot axis, securement means carried by said body and engageable with said tailgate adjacent its lower edge portion to releasably lock said tailgate in its closed position, said securement means being releasable as said tailgate pivot axis is shifted from its lower location into its upper location to allow said tailgate to be moved from its closed into its open position, said securement means locking said tailgate in its closed position after said tailgate pivot axis is shifted from its upper location into its lower location and said cylinder means is actuated to retract said piston rods into the associated cylinder parts.

2. In combination, a vehicle body open at one end and a tailgate having upper and lower edge portions extending between spaced side edges, means pivotally connecting said tailgate at its upper edge portion to said body so that said tailgate is pivotal about an axis between a closed position spanning said one end of the body and an open position, said connecting means between said tailgate and body including a spaced pair of rigid links located between the side edges of said tailgate, each link having one end pivotally connected to said tailgate upper edge portion and having its opposite end pivotally connected to said body above said open end therein, the pivot connections of said one ends of the links to said tailgate forming said tailgate pivot axis, a spaced pair of power actuated cylinder means for moving said tailgate between its open and closed positions and including an extendible and retractable piston rod slidable within a cylinder part, each said rod being pivotally connected at one end to said tailgate, each said cylinder part being pivotally connected at one end to the body, the pivot connection of each said cylinder part being at opposite sides of the open end of the body such that said cylinder means is substantially vertically oriented along the plane of the open end when said tailgate is in the closed position, the pivot connection of each said rod to said tailgate being above and rearwardly of the pivot connection of each said cylinder part to said body, said cylinder means upon the initial extension of said rod for causing said tailgate pivot axis and one ends of said links to be shifted upwardly from a lower into an upper location relative to said body, said cylinder means upon the final retraction of said rod for causing said tailgate pivot axis and link one ends to be shifted downwardly into said lower location, securement means carried by said body and engageable with said tailgate adjacent its lower edge portion to releasably lock said tailgate in its closed position, said securement means being releasable as said tailgate pivot axis is shifted from its lower location into its upper location to allow said tailgate to be moved from its closed into its open position, said securement means locking said tailgate in its closed position as said tailgate pivot axis is shifted from its upper location into its lower location.

3. The combination of claim 2 and including a pin carried by said tailgate at its lower edge portion, said securement means defining a receiving part having a slot means therein, said slot means being inclined at its upper end to accommodate said pin and having a connecting vertically oriented extension for locking engagement of said pin as said tailgate pivot axis is shifted from its upper into its lower location and each said piston rod is retracted within its associated cylinder part.

* * * * *